US009213679B2

(12) United States Patent
Shen

(10) Patent No.: US 9,213,679 B2
(45) Date of Patent: Dec. 15, 2015

(54) DEVICE WITH CAPABILITY OF PROCESSING FFT RADIX 2 BUTTERFLY OPERATION AND OPERATION METHOD THEREOF

(75) Inventor: Chengke Shen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 304 days.

(21) Appl. No.: 14/115,340

(22) PCT Filed: Apr. 20, 2012

(86) PCT No.: PCT/CN2012/074451
§ 371 (c)(1),
(2), (4) Date: Nov. 2, 2013

(87) PCT Pub. No.: WO2012/149871
PCT Pub. Date: Nov. 8, 2012

(65) Prior Publication Data
US 2014/0089368 A1    Mar. 27, 2014

(30) Foreign Application Priority Data
May 5, 2011    (CN) .......................... 2011 1 0115129

(51) Int. Cl.
*G06F 17/14*    (2006.01)
(52) U.S. Cl.
CPC .................................... *G06F 17/142* (2013.01)
(58) Field of Classification Search
USPC ........................................................ 708/409
See application file for complete search history.

(56) References Cited

U.S. PATENT DOCUMENTS

| 4,996,661 | A | * | 2/1991 | Cox | ......................... G06F 7/483 708/508 |
| 5,028,877 | A | | 7/1991 | Muller et al. | |
| 6,317,770 | B1 | | 11/2001 | Lim | |
| 2001/0039557 | A1 | | 11/2001 | Lim | |
| 2003/0009502 | A1 | * | 1/2003 | Katayanagi | ........... G06F 9/3001 708/622 |
| 2008/0126758 | A1 | | 5/2008 | Kwon | |

(Continued)

FOREIGN PATENT DOCUMENTS

| CN | 1464690 A | 12/2003 |
| CN | 1486001 A | 3/2004 |

(Continued)

OTHER PUBLICATIONS

International Search Report in international application No. PCT/CN2012/074451 mailed on Aug. 2, 2012. (2 pages—see entire document).

(Continued)

*Primary Examiner* — Andrew Caldwell
*Assistant Examiner* — Matthew Sandifer
(74) *Attorney, Agent, or Firm* — Oppedahl Patent Law Firm LLC

(57) ABSTRACT

The disclosure provides a device with a capability of processing a Fast Fourier Transform Algorithm (FFT) radix 2 butterfly operation and an operation method thereof, the device at least includes a latch, a complex multiplier, a complex adder-subtractor, a switch and a complex conjugate Arithmetic Logical Unit (ALU). The complex operation unit of the disclosure has a simple structure. The parallel processing array composed of the complex operation unit has the capability of efficiently processing vectors and the FFT operation.

9 Claims, 2 Drawing Sheets

(56) References Cited

U.S. PATENT DOCUMENTS

2009/0112959 A1* 4/2009 Henry .................... G06F 17/142
                                                    708/404
2012/0166508 A1* 6/2012 Kim ...................... G06F 17/142
                                                    708/404

FOREIGN PATENT DOCUMENTS

| CN | 1700203 A | 11/2005 |
| CN | 101587469 A | 11/2009 |
| JP | H05174046 A | 7/1993 |

OTHER PUBLICATIONS

English Translation of the Written Opinion of the International Search Authority in international application No. PCT/CN2012/074451, mailed on Aug. 2, 2012. (7 pages—see entire document).
On the FFT Processor by FPGA Implementation Based on the OFDM Technology, mailed on Dec. 31, 2010.
Supplementary European Search Report in European application No. 12779547.4, mailed on Apr. 8, 2015.

* cited by examiner

DEVICE WITH CAPABILITY OF PROCESSING FFT RADIX 2 BUTTERFLY OPERATION AND OPERATION METHOD THEREOF

TECHNICAL FIELD

The disclosure relates to large scale digital signal processing technique, in particular to a device with a capability of processing a Fast Fourier Transform (FFT) radix 2 butterfly operation and an operation method thereof.

BACKGROUND

Large scale digital signal processing technique, especially array digital signal and FFT processing technique requires a processor platform to provide a strong capability of processing parallel. Such parallel array processor with a capability of processing large scale digital signal has more extensive application in the field of large scale digital signal processing.

In the digital signal processing field, a large scale parallel operation array is used widely with the constant increases of signal processing speed and complexity and cost performance ratio of the processor. In particular in the field of wireless communications, a lot of applications of new baseband technology, such as Multiple-Input Multiple-Output (MIMO), antenna array beam forming technology, multi-user interference counteract (Turbo-MIMO), puts enormous pressure on the digital signal processing platform. In the circumstances, the parallel processing array shows its strong performance on high speed signal processing.

SUMMARY

Accordingly, the main purpose of the disclosure is to provide a device with a capability of processing an FFT radix 2 butterfly operation and an operation method thereof, which have a capability of efficiently processing vectors and strong FFT radix 2 butterfly operation.

To this end, the technical scheme of the disclosure is realized as follows. A device with a capability of processing a Fast Fourier Transform (FFT) radix 2 butterfly operation includes: a latch, a complex multiplier, a complex adder-subtractor, a switch and a complex conjugate Arithmetic Logical Unit (ALU), wherein:

the complex conjugate ALU is configured to convert input data X into a conjugate of the input data X;

a fourth switch is configured to select the input data X or the conjugate of the input data X to output the selected data;

a first switch is configured, under control of an external control signal, to send the input data X or the conjugate of the input data X to one of a first latch, a second latch and a third latch in each clock to temporarily store the sent data;

the complex multiplier is configured to have two inputs of which one is from the first latch and another is from a second switch, wherein data generated by the complex multiplier is output to a fifth latch to be latched;

the second switch is configured, under control of an external control signal, to input output data of the second latch or a complex constant 1.0 to the complex multiplier;

the complex adder-subtractor is configured to have two inputs of which one is from the fifth latch and another is from a third switch;

the third switch is configured to have three inputs which respectively are from output of the third latch, output of a fourth latch and a complex constant 0.0, and the third switch is configured, under control of an external control signal, to select one input to transmit the selected input to the complex adder-subtractor; and the fourth latch is configured to store output of the complex adder-subtractor, and to form an accumulator together with the complex adder-subtractor; wherein output of the fourth latch is output Y of the device.

At least two devices with a capability of processing an FFT radix 2 butterfly operation may form a parallel complex operation array.

An operation method of a device with a capability of processing a Fast Fourier Transform (FFT) radix 2 butterfly operation includes:

performing a single-operand operation using the above device.

The single-operand operation may include: a traversing operation, a single-operand complex add or subtraction operation.

The method may further include: performing a double-operand operation using the device.

The double-operand operation may include: a double-operand add or subtraction operation, a double-operand multiplication.

The method may further include: performing a triple-operand operation using the device.

The triple-operand operation may include: a triple-operand multiply-add or multiply-subtraction operation, and a triple-operand FFT radix 2 butterfly operation.

A parallel complex operation array is formed when there are two or more devices; and the method may further include: performing addition and subtraction of two K dimension complex vectors and elements multiplication operations, multiplication of a K*K matrix by a K*1 vector, a 2K point FFT radix 2 butterfly operation by using K devices, wherein K is a number of the devices.

It can be seen from the above solutions, the complex operation unit of the disclosure has a simple structure, and the parallel processing array composed of the complex operation unit has the capability of efficiently processing vectors and an FFT radix 2 butterfly operation.

DETAILED DESCRIPTION

Figure 1:
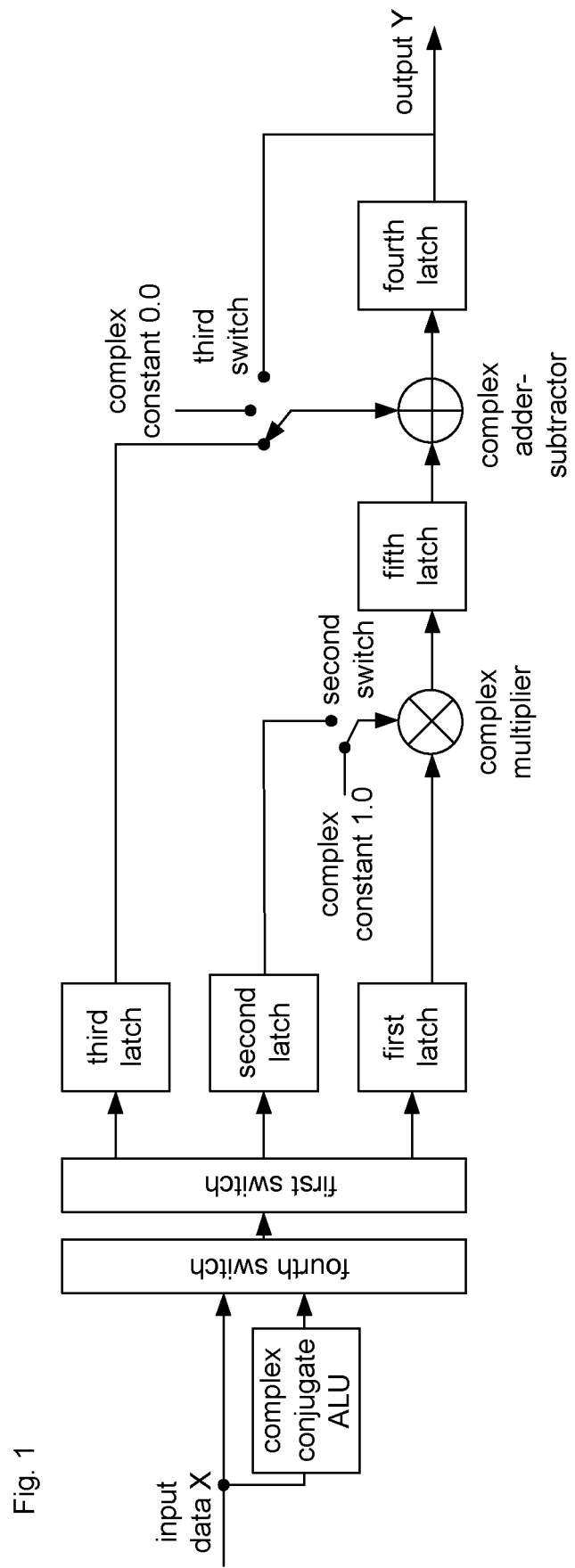
FIG. 1 shows a schematic diagram of a structure of a device with a capability of processing an FFT radix 2 butterfly operation according to the disclosure.

FIG. 1 shows a schematic diagram of a structure of a device with a capability of processing an FFT radix 2 butterfly operation according to the disclosure. As shown in FIG. 1, the device at least includes a latch, a complex multiplier, a complex adder-subtractor, a switch and a complex conjugate Arithmetic Logical Unit (ALU). The disclosure does not limit an input and output bit width of each of the latch, the complex multiplier, the complex adder-subtractor, the switch and the complex conjugate ALU. Specific description may be as follows.

The device with a capability of processing an FFT radix 2 butterfly operation shown in FIG. 1 is also known as a complex operation unit which may be a fixed point operation unit or a floating point operation unit. The complex operation unit has input data X.

The complex conjugate ALU outputs a conjugate value of X. A fourth switch S4 selectively inputs the input data X or the conjugate value of X, and is connected to three latches (i.e., a first latch, a second latch and a third latch) through a first switch S1.

The first, second and third latches are configured, under the control of the first switch S1, to provide the input data X to one latch of them to temporarily store the input data X.

The complex multiplier has two inputs of which one is from the first latch and another is from a second switch S2.

The second switch S2 is configured, under the control of an external control signal, to input output data of the second latch or a complex constant 1.0 to the complex multiplier. Output data of the complex multiplier is latched by a fifth latch.

The complex adder-subtractor has two inputs of which one is from the fifth latch and another is from a third switch S3.

The third switch S3 has three inputs which respectively are from output of the third latch, output of a fourth latch and a complex constant 0.0. The switch S3 is configured, under the control of an external control signal, to select one input to transmit the selected input to the complex adder-subtractor. The principle for implementing external control is as follows: if an operation does not include an add operation, the third switch S3 selects the complex constant 0.0, i.e., to add 0.0; if the operation includes an add operation, the third latch is selected; if the operation needs to perform an accumulation operation, the fourth latch is selected.

The fourth latch is configured to store output of the complex adder-subtractor, to form an accumulator together with the complex adder-subtractor, and to be cooperated with the complex multiplier to perform a complex MAC operation.

The disclosure does not limit processed data and bit width thereof which may be a floating point or a fixed point.

Specifically, a single-operand operation performed by the complex ALU is as follows.

traversing: the input data X is directly output. As shown in FIG. 1, a data path is: input X→the fourth switch S4→the first switch S1 the first latch→the complex multiplier (multiply by the complex constant 1.0)→the fifth latch→the complex adder-subtractor (add the complex constant 0.0)→the fourth latch→output Y.

A single-operand complex conjugate operation: it means that a conjugate operation is performed on an external complex. As shown in FIG. 1, a data path is: input X→the complex conjugate ALU→the fourth switch S4→the first switch S1→the first latch→the complex multiplier (multiply by the complex constant 1.0)→the fifth latch→the complex adder-subtractor (add the complex constant 0.0)→the fourth latch→output Y.

A single-operand complex add (subtraction) operation: it means that an external complex adds (or subtracts) data in the internal fourth latch. As shown in FIG. 1, a data path is: input X→the fourth switch S4→the first switch S1 the first latch→the complex multiplier (multiply by the complex constant 1.0)→the fifth latch→the complex adder-subtractor (add or subtract data stored in the fourth latch)→the fourth latch→output Y.

A double-operand operation performed by the complex ALU is as follows.

A double-operand complex add (subtraction) operation: it means that two operands pass the fourth switch and the first switch in adjacent two periods and are respectively transmitted to the first latch and the third latch. A data path is as follows.

At first, input X1→the first latch; input X2→the third latch;

Next, the first latch→the complex multiplier (multiply by the complex constant 1.0)→the fifth latch→the complex adder-subtractor (add or subtract output data of the third latch)→the fourth latch→output Y.

An output passing rate of the double-operand complex add (subtraction) operation is that one operation is performed in every two periods.

A double-operand complex multiplication: it means that two operands pass the fourth switch and the first switch in adjacent two periods and are respectively transmitted to the first latch and the second latch. A data path is as follows.

At first, input X1→the first latch; input X2→the second latch;

Next, the first latch→the complex multiplier (multiply by data temporarily stored in the second latch)→the fifth latch→the complex adder-subtractor (add the complex constant 0.0)→the fourth latch→output Y.

An output passing rate of the double-operand complex multiplication is that one operation is performed in every two periods.

A triple-operand operation performed by the complex ALU is as follows.

A triple-operand complex multiply-add (or multiply-subtraction) operation, i.e., (A*B+C), in which two operands A and B are from external and the operand C is from the internal fourth latch. The two operands A and B pass the fourth switch and the first switch in adjacent two periods and are respectively transmitted to the first latch and the second latch. A data path is as follows.

At first, input A→the first latch; input B→the second latch;

Next, the first latch→the complex multiplier (multiply by data temporarily stored in the second latch)→the fifth latch→the complex adder-subtractor (add or subtract data temporarily stored in the fourth latch)→the fourth latch→output Y.

An output passing rate of the triple-operand complex multiply-add (or multiply-subtraction) operation is that one operation is performed in every two periods.

Another triple-operand complex multiply-add (or multiply-subtraction) operation, i.e., (A*B+C), in which each operand A, B and C is from external. Three operands A, B and C pass the fourth switch and the first switch in adjacent two periods and are respectively transmitted to the first latch, the second latch and the third latch. A data path is as follows.

At first, input A→the first latch; input B→the second latch; input C→the third latch;

Next, the first latch>the complex multiplier (multiply by data temporarily stored in the second latch)→the fifth latch→the complex adder-subtractor (add or subtract data temporarily stored in the third latch)→the fourth latch→output Y.

An output passing rate of this triple-operand complex multiply-add (or multiply-subtraction) operation is that one operation is performed in every three periods.

Triple-operand FFT radix 2 butterfly operation, i.e., Z0=a+W*b or Z1=a−W*b. Each operand a, b and W is from external. Three operands a, b and W pass the fourth switch and the first switch in adjacent two periods and are respectively transmitted to the first latch, the second latch and the third latch. A data path is as follows.

At first, input b→the first latch; input W→the second latch; input a→the third latch;

Next, the first latch→the complex multiplier (W multiply by b, i.e., W*b)→the fifth latch;

A data path for Z0=a+Wb is as follows: →the complex adder-subtractor (add output data of the third latch, i.e., a+W*b)→the fourth latch→output Y.

A data path for Z0=a−Wb is as follows: the complex adder-subtractor (subtract output data of the fifth latch from output data of the third latch, i.e., a−W*b)→the fourth latch→output Y.

An output passing rate of the triple-operand FFT radix 2 butterfly operation is that one FFT radix 2 butterfly operation is performed in every three periods.

The following complex operations may be performed through the complex operation unit shown in FIG. 1: complex conjugate; complex A adds/subtracts complex B; complex A multiples by complex B; complex A multiples by complex B and then adds/subtracts complex C; Radix 2 FFT butterfly operation, complex A, complex B and complex C are input data.

Several complex operation units (such as K units) shown in FIG. 1 may form a parallel complex operation array (K array for short). The K array may be used as an ALU for a vector processor or an array processor, in which the K array may have a capability of running complex addition or multiplication K times in each clock cycle. The K array may have a capability of running the FFT radix 2 butterfly operation K times in three clocks.

Figure 2:
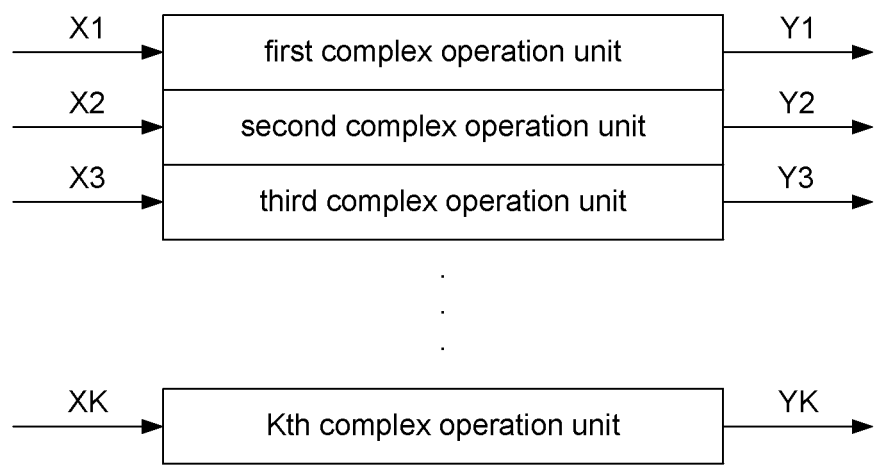
FIG. 2 shows a schematic diagram of an operation array composed of a device with a capability of processing an FFT radix 2 butterfly operation according to the disclosure.

FIG. 2 shows a schematic diagram of an operation array composed of a device with a capability of processing an FFT radix 2 butterfly operation according to the disclosure. As shown in FIG. 2, a K array composed of K complex operation units may perform vector, an FFT operation and a Discrete Fourier Transform (DFT) operation. Hereinafter, the device will be described in detail with some examples.

For addition and subtraction of two K dimension complex vectors and elements multiplication operations, the K array has a capability of processing one operation in every two periods.

For multiplication of a K*K matrix by a K*1 vector, the K array has a capability of processing one operation in every (K+1) periods.

For a 2K point FFT operation, the K array has a capability of processing one operation in every 3 $Log_2 2K$ periods.

K common multiple vector, matrix or FFT may be divided into sub-vectors, sub-matrixes or sub-modules by taking K as a unit, then each of sub-vectors, sub-matrixes or sub-modules is operated respectively, and then results are put together.

For K common measure vector, matrix or FFT, the K array may perform plurality of operations in parallel, simultaneously.

For other cases, a plurality of manners such as partition or mergence may be used. The principle is to take full advantage of resource of each operation unit of the K array.

It is obvious for those skilled in the art to use the K array composed of K complex operation units to perform operations based on the complex operation unit shown in FIG. 1, which will not be further elaborated.

The complex operation unit of the disclosure has a simple structure. The parallel processing array composed of the complex operation unit has the capability of efficiently processing vectors and the FFT operation.

Since the FFT operation is widely used in digital signal processing, in particular to the fourth generation mobile communication based on the Orthogonal Frequency Division Multiplexing (OFDM) technique, such as a Long Term Evolution (LTE) system and a Worldwide Interoperability for Microwave Access (WiMAX) system, the capability of processing FFT directly affects application cost of the whole system, therefore, the operation array composed of the complex operation unit with a capability of processing an FFT radix 2 butterfly operation according to the disclosure may directly be used to construct a high performance baseband processor.

Since the complex operation unit according to the disclosure has programmability, the parallel array processor composed of the complex operation unit may be used as a wireless multimode soft baseband platform for covering a plurality of wireless standards such as LTE, WiMAX, WCDMA, TD-SCDMA, CDMA2000 and the like.

Although preferable embodiments of the disclosure have been described for the sake of illustration, those skilled in the art will note that it is possible to make various modifications, additions and replacements. Therefore, the protection scope of the disclosure is not limited to the above embodiments.

What is claimed is:

1. A device with a capability of processing a Fast Fourier Transform (FFT) radix 2 butterfly operation, comprising a plurality of latches, a complex multiplier, a complex adder-subtractor, a plurality of switches and a complex conjugate Arithmetic Logical Unit (ALU), wherein:
   the complex conjugate ALU is configured to convert input data X into a conjugate of the input data X;
   a fourth switch is configured to select between the input data X and the conjugate of the input data X to output the selected data;
   a first switch is configured, under control of an external control signal, to select between the input data X and the conjugate of the input data X to send to one of a first latch, a second latch and a third latch in each clock to temporarily store the sent data;
   the complex multiplier is configured to have two inputs of which one is from the first latch and another is from a second switch, wherein data generated by the complex multiplier is output to a fifth latch to be latched;
   the second switch is configured, under control of an external control signal, to select between output data of the second latch and a complex constant 1.0 to input to the complex multiplier;
   the complex adder-subtractor is configured to have two inputs of which one is from the fifth latch and another is from a third switch;
   the third switch is configured to have three inputs which respectively are from output of the third latch, output of a fourth latch and a complex constant 0.0, and the third switch is configured, under control of an external control signal, to select one input to transmit the selected input to the complex adder-subtractor; and
   the fourth latch is configured to store output of the complex adder-subtractor, and to form an accumulator together with the complex adder-subtractor;
   wherein output of the fourth latch is output Y of the device.

2. The device according to claim 1, wherein at least two devices with a capability of processing an FFT radix 2 butterfly operation form a parallel complex operation array.

3. An operation method of a device with a capability of processing a Fast Fourier Transform (FFT) radix 2 butterfly operation, comprising:
   performing a single-operand operation using the device according to claim 1.

4. The method according to claim 3, the single-operand operation comprises: a traversing operation, a single-operand complex add or subtraction operation.

5. The method according to claim 3, further comprising: performing a double-operand operation using the device.

6. The method according to claim 5, the double-operand operation comprises: a double-operand add or subtraction operation, a double-operand multiplication.

7. The method according to claim 5, further comprising:
   performing a triple-operand operation using the device.

8. The method according to claim 7, the triple-operand operation comprises: a triple-operand multiply-add or multiply-subtraction operation, and a triple-operand FFT radix 2 butterfly operation.

9. The method according to claim 5, wherein a parallel complex operation array is formed when there are two or more devices; the method further comprising:
   performing addition and subtraction of two K dimension complex vectors and elements multiplication operations, multiplication of a K*K matrix by a K*1 vector, a 2K point FFT radix 2 butterfly operation by using K devices, wherein K is a number of the devices.

* * * * *